United States Patent

[11] 3,631,870

[72] Inventor William L. Livingston
Norwood, Mass.
[21] Appl. No. 28,438
[22] Filed Apr. 14, 1970
[45] Patented Jan. 4, 1972
[73] Assignee Factory Mutual Research Corporation
Norwood, Mass.

[54] METHOD OF STOPPING FLOW IN A PIPELINE
11 Claims, 1 Drawing Fig.
[52] U.S. Cl. .................................................. 137/15,
138/89, 137/1
[51] Int. Cl. ................................................ F16l 55/10
[50] Field of Search .......................................... 137/13, 15,
1; 138/89

[56] References Cited
UNITED STATES PATENTS

| | | | |
|---|---|---|---|
| 3,125,107 | 3/1964 | Wood | 137/13 |
| 2,701,755 | 2/1955 | Strasser | 137/1 X |
| 2,492,173 | 12/1949 | Mysels | 137/13 |
| 3,156,263 | 11/1964 | Adelman | 137/89 |
| 3,310,615 | 3/1967 | Bender | 137/89 X |

*Primary Examiner*—Alan Cohan
*Attorney*—Lane, Aitken, Dunner & Ziems

ABSTRACT: Method of arresting the flow of liquid in a pipeline so that the pipeline can be repaired or altered comprising transforming the flowing liquid into a gel which resists push.

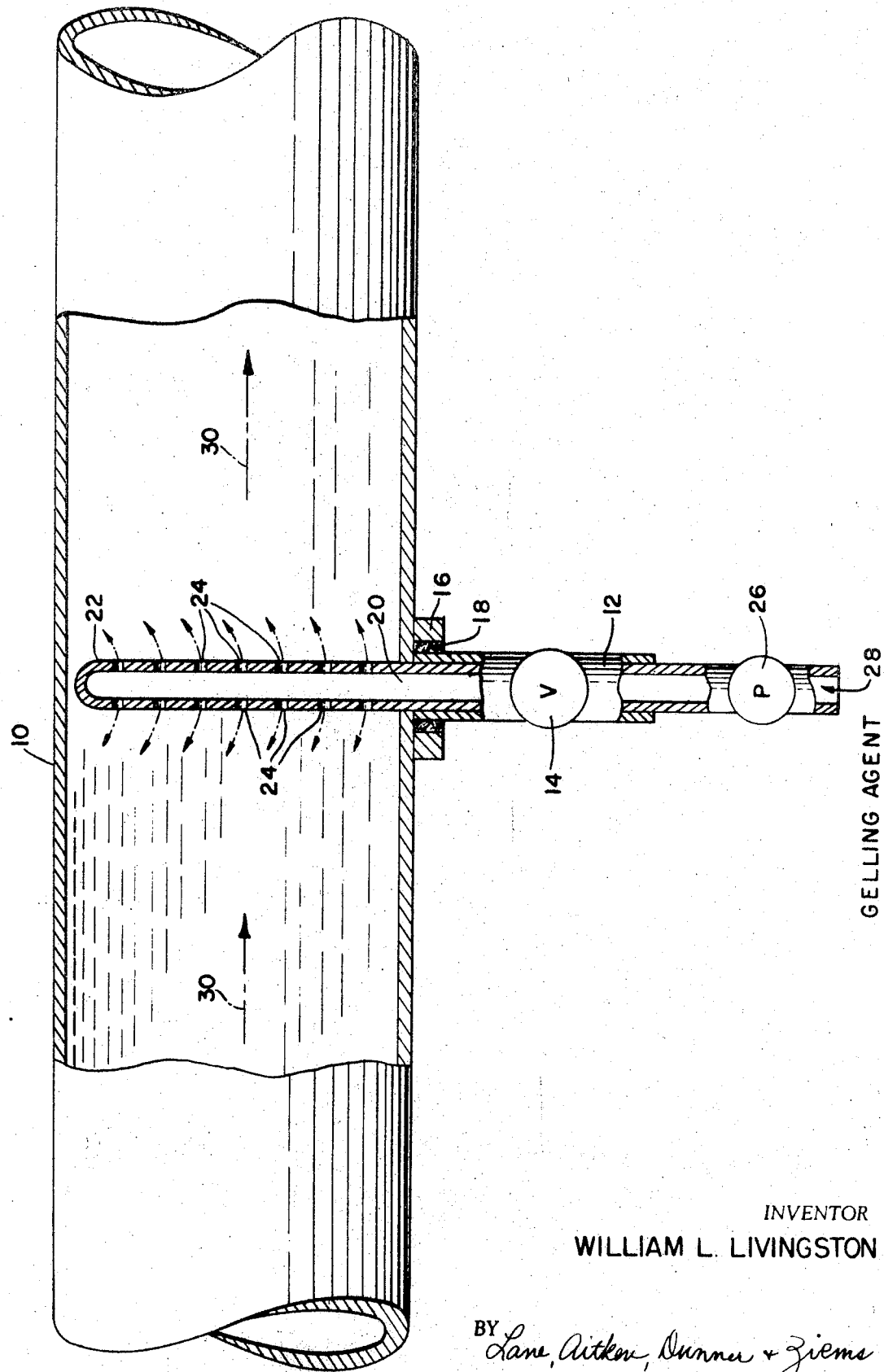

3,631,870

METHOD OF STOPPING FLOW IN A PIPELINE

BACKGROUND OF THE INVENTION

This invention is directed to the field of pipeline repair and alteration. It especially relates to pipelines which carry flowing liquids.

The repair or alteration of a pipeline carrying flowing liquid is complicated by the fact that it is often desirable to arrest the liquid flow in the area of the repair or alteration before said repair or alteration is carried out. For example, if a leak in the pipeline is being repaired, it is desirable to stop the liquid flow in the area of the leak to alleviate pressure at the leak and minimize the amount of liquid exiting from the leak so that repair of the leak can be effected more easily. Similarly in the case of rerouting a pipeline or portion thereof, or in the case of connecting a branch line to a pipeline, temporary flow stoppage may be desirable.

The problem of liquid flow stoppage in a pipeline is easily solved if the pipeline contains an installed means such as a valve for terminating the liquid flow.

The present invention is useful in situations where a flow stoppage is needed and can be tolerated, and either where installed means for flow stoppage not only effects flow stoppage in the area of repair or alteration but also in areas where it is undesirable to effect flow stoppage, or where no installed means is available for effecting flow stoppage. For example, the present invention would be especially useful in a situation where a leak occurs in a branch line in a city water system where the only installed shutoff valve is in a main waterline upstream of the branch and the main line has other branch lines in which flow would be stopped by the application of the shutoff valve in the main line.

Methods of inserting temporary plug-forming material into a pipeline so that repairs or the like can be made are known. For example, Witt, U.S. Pat. No. 2.002.383 discloses a method of stopping gas flow through pipes by inserting slush into the gasline and then freezing the slush to ice to plug the pipe. Manning, U.S. Pat. No. 2,320,371 discloses the introduction of a foam-forming substance into a stagnant liquid in a pipeline to develop a temporary plug. However, no prior art reference is known to applicant which discloses a key result of the instant invention of forming a plug in a flowing liquid to effect stoppage of flow in a pipeline.

SUMMARY OF THE INVENTION

In accordance with the present invention, a plug is formed in a line of flowing liquid by the transformation of the flowing liquid into a gel which resists push whereby flow ceases downstream of the gel site.

In particular, the method of the present invention comprises converting the flowing liquid in the pipeline into a gel having a yield valve that is greater than the push available in the system to form a plug in the pipeline whereby flow is stopped. The term "yield valve" is used herein to mean the threshold value of force which must be applied before any net flow occurs.

The gel is formed by the introduction into the flowing liquid upstream of the zone where flow stoppage is desired of a suitable gelling agent. After stoppage of flow is caused to occur, introduction of gelling agent is discontinued. At this point the desired repair or alteration to the pipeline can be carried out. The plug can then be destroyed in order to restore flow.

BRIEF DESCRIPTION OF THE DRAWING

The single FIGURE of the drawing is a vertical cross-sectional view with a portion of the piping shown in elevation of a process within the scope of the present invention.

DETAILED DESCRIPTION OF THE INVENTION

With continuing reference to the single FIGURE or the drawing, the process of the present invention can be advantageously carried out, for example, by securing to a pipeline 10, upstream of the zone to be repaired, a pipe member 12 equipped with a valve 14. Pipe member 12 is affixed to main pipeline 10 by a clamp 16 which is clamped to main pipeline 10 by U-bolts (not shown). The clamp 16 holds in place against pipe 12 a packing or sealing member 18. With the valve 14 in opened position, an opening 20 is drilled in pipeline 12 where the opening in pipe member 12 butts up against pipeline 10. When the drill bit is removed after the drilling of opening 20, valve 14 is closed so essentially no liquid is lost from the system. A distributor 22 is then inserted through pipe member 12 and valve 14 into the pipeline 10. Distributor 22 has its end which protrudes into pipeline 10 capped. The portion of distributor 22 which protrudes into pipe 10 contains apertures 24 through which liquid can be distributed into pipeline 10. The portion of distributor 22 removed from pipeline 10 contains a pump 26 to force liquid through distributor 22 into pipeline 10.

Suitable gelling agent 28 is forced by pump 26 through apertures 24 into the liquid flowing in pipeline 10 as represented by arrows 30 to convert the liquid flowing in pipeline 10 into a gel having a yield value greater than the pressure head under which the liquid is flowing. The formed gel plugs the pipeline 10 downstream of distributor 22.

After the repair or alteration has been carried out in pipeline 10, flow is restored in pipeline 10 by the injection into the pipeline through distributor 22 of a plug-destroying agent whereby the yield value of the material in pipeline 10 is reduced so as to be less than the push in the system.

Once flow has been restored, distributor 22 can be removed from pipeline 10 and valve 14 closed to prevent leakage. Alternatively, distributor 22, pipe member 12, clamp 16 and seal 18 are removed and opening 20 is capped by conventional methods.

The method of the present invention is useful for pipelines which carry any of the liquids which are commonly carried by pipelines. For example, it is useful for pipelines carrying flowing water or flowing organic liquids such as gasoline or oil. The term "oil" is used herein to mean a petroleum oil or mineral oil or a hydrocarbon oil derived from crude petroleum as distinguished from fatty oils or essential oils.

The type and amount of agent which is inserted into the pipeline to convert the liquid flowing in it to a gel having a yield value greater than the push available in the system, that is into a plug-forming gel, depends upon the type of liquid flowing in the pipeline and also on the flow rate and other flow characteristics of the liquid flowing in the pipeline.

Gelling agents for use in converting flowing water into a plug-forming gel within the scope of the present invention include, for example, cross-linked ethylene maleic anhydride, such as a material sold by the Monsanto Company under the trade name EMA-91. Another such material which is useful is the diammonium sodium salt of EMA-91, which is sold by the Monsanto Company under the trade name EMA-94. Other materials, such as a water-swellable, cross-linked polymer sold by the B. F. Goodrich Chemical Company under the trade name Carbopol-960, are also useful, as are materials such as those described in Katzer U.S. Pat. No. 3,354,084 and Bashaw, U.S. Pat. No. 3,229,769.

The specially preferred gelling agent for use herein with water is sold under the trade name Gelgard M by the Dow Chemical Company. Gelgard M is a cross-linked hydrolyzed polyacrylamide-acrylate polymer represented by the structural formula

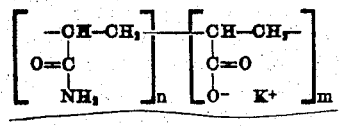

Wherein $n/m$ is approximately 3, and has an average molecular weight of about 20,000. Preferably, it is utilized in particulate form, having a particle size of through 325 mesh U.S. Standard Sieve Series.

The amount of these gelling agents to convert the flowing water into a plug-forming gel ordinarily ranges from about 0.5 percent by weight to about 5 percent by weight of the admixture of water and gelling agent and preferably ranges from about 2 percent by weight to about 4 percent by weight of said admixture.

Aluminum stearate can be utilized to transform either flowing gasoline or flowing oil into a plug-forming gel whereby flow stoppage is achieved.

The gelling agent is conveniently introduced into a pipeline in combination with a carrier. For the agents utilized to convert water into a plug-forming gel isopropyl alcohol is a suitable carrier, for example, with the alcohol amounting by weight from about 20 percent to about 60 percent of the gelling agent-alcohol combination.

Preferably, the gelling agent is introduced into the pipeline at a constant rate. In this case the gelling agent initially introduced slows the flow rate of the liquid in the pipeline. This slowed flow rate in combination with the constant rate introduction of gelling agent results in an increased concentration of gelling agent in liquid in the pipeline whereby the flow rate is slowed further. This pattern continues until a gel of the proper yield value is formed whereby plugging is achieved. Thus, constant rate introduction of gelling agent results in a progressively increasing concentration of gelling agent in the liquid in the pipeline and a progressively decreasing flow rate until flow is stopped. Thus, constant rate introduction has the advantage of necessarily resulting in the formation of a gel within the scope of the present invention. Constant rate introduction has the additional advantage that the gel closest to the injection point has the highest yield value whereby the plug can be destroyed by the introduction of agent at the injection point without all of the gel structure throughout the length of the pipeline having its yield value reduced.

The agent inserted to destroy the plug and restore flow can simply be sufficient of the liquid that was originally converted into gel form to reduce the concentration of gelling agent in the plug to the point where the yield value of gel in the plug is reduced to the point where it is less than the push in the system.

Where water is the liquid which has been converted into a plug-forming gel, any electrolyte with is not otherwise harmful to the system can be inserted into the pipeline as a plug-destroying agent. Suitable electrolyte plug-destroying agents include, for example, strong inorganic acids such as sulfuric acid or hydrochloric acid, strong bases such as sodium hydroxide or potassium hydroxide, and weak acids such as acetic acid or tartaric acid. Preferred electrolytes are salts such as sodium chloride, potassium chloride, magnesium chloride, sodium sulfate, iron sulfate, sodium carbonate, calcium bromide and other water-soluble electrolyte salts.

The present invention can also be adapted to systems where flow stoppage cannot be tolerated by providing a bypass line around the area in which the plug is to be formed so that the liquid flow can be channeled around the plug to a point downstream of the repair zone.

The present invention is further illustrated in the following example wherein a plug is formed in a water main line so that repair can be effected.

EXAMPLE

A 3-inch pipeline in which water is flowing at a rate of 30 to 40 ft. per second under a pressure head of 120 lbs. per square inch is plugged so that repairs can be carried out. The plug is formed and the waterflow is stopped as follows:

A distributor is inserted into the pipeline by the method depicted in the single FIGURE of the drawing. The distributor is inserted through a ⅜inch-diameter hole which is drilled in the pipeline.

One pound of Gelgard M having a particle size of through 325 mesh U.S. Standard Sieve Series is pumped at a constant rate over a 1-minute period into the pipeline through the distributor to provide a concentration of 3.5 percent by weight Gelgard M and 96.5 percent by weight water in a portion of the pipeline downstream of the distributor. The Gelgard M is inserted into the pipeline in the form of a slurry containing by weight 57 percent isopropyl alcohol as a carrier, 3 percent Cab-o-sil M-5 as a slurry stabilizing agent, and 40 percent Gelgard M.

The insertion of the Gelgard M converts the water in the pipeline to a plug-forming gel. Stoppage of flow occurs shortly after the insertion of the Gelgard M.

After repairs have been carried out, the plug is destroyed and flow restored by the insertion through the distributor of an aqueous saturated sodium chloride solution.

The distributor is then removed from the pipeline and the ⅜-inch opening through which it was inserted is plugged.

An oil pipeline can be plugged by the method of the above example except that aluminum stearate is inserted instead of Gelgard M.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

What is claimed is:

1. A method of arresting the flow of liquid in a pipeline so that the pipeline can be repaired or altered, said method comprising the step of transforming the flowing liquid into a gel which resists push whereby flow ceases downstream of the gel site.

2. The method of claim 1 wherein the gel is formed by converting the liquid flowing in the pipeline into a gel having a yield value greater than the push available in the system.

3. The method of claim 1 wherein the flowing liquid is water and gelling agent is inserted into the pipeline to convert the flowing water into a plug-forming gel.

4. The method of claim 3 wherein the gelling agent is Gelgard M.

5. The method of claim 3 wherein the amount of gelling agent utilized ranges from about 0.5 percent to about 5 percent by weight of the admixture of water and gelling agent.

6. The method of claim 5 wherein the amount of gelling agent utilized ranges from about 2 percent to about 2 percent by weight of said admixture.

7. The method of claim 2 wherein the flowing liquid is oil and aluminum stearate is inserted into the pipeline to convert the flowing oil into a plug-forming gel.

8. The method of claim 2 wherein the flowing liquid is gasoline and aluminum stearate is inserted into the pipeline to convert the flowing gasoline into a plug-forming gel.

9. The method of claim 3 wherein the formed gel is destroyed by the admixture with the gel of an electrolyte.

10. The method of claim 9 wherein the electrolyte is sodium chloride.

11. The method of claim 3 wherein the gelling agent is introduced at a constant flow rate.

* * * * *

UNITED STATES PATENT OFFICE
CERTIFICATE OF CORRECTION

Patent No. 3,631,870                     Dated January 4, 1972

Inventor(s)  William L. Livingston

It is certified that error appears in the above-identified patent and that said Letters Patent are hereby corrected as shown below:

Claim 6, line 2, the phrase "from about 2 percent to about 2 percent" should read ---from about 2 percent to about 4 percent---

Signed and sealed this 23rd day of May 1972.

(SEAL)
Attest:

EDWARD M. FLETCHER, JR.                ROBERT GOTTSCHALK
Attesting Officer                      Commissioner of Patents